(12) United States Patent
Mashimo et al.

(10) Patent No.: US 7,355,942 B2
(45) Date of Patent: Apr. 8, 2008

(54) OPTICAL DISK AND OPTICAL DISK DRIVE FOR SUPPRESSING A DIGITAL SUM VALUE AND LOW-FREQUENCY COMPONENTS

(75) Inventors: Akira Mashimo, Tokorozawa (JP); Yutaka Yamanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 562 days.

(21) Appl. No.: 10/991,918

(22) Filed: Nov. 17, 2004

(65) Prior Publication Data
US 2005/0105423 A1 May 19, 2005

(30) Foreign Application Priority Data
Nov. 17, 2003 (JP) ............... 2003-387134

(51) Int. Cl.
G11B 7/0045 (2006.01)
G11B 7/007 (2006.01)

(52) U.S. Cl. .................... 369/47.5; 369/59.24
(58) Field of Classification Search ............ None
See application file for complete search history.

(56) References Cited

U.S. PATENT DOCUMENTS 6,687,206 B1 * 2/2004 Masui .............. 369/47.19

2003/0053389 A1 3/2003 Mashimo

FOREIGN PATENT DOCUMENTS

| JP | 9-91885 | 4/1997 |
|----|---------|--------|
| JP | 9-246979 | 9/1997 |
| JP | 2001-266348 | 9/2001 |
| JP | 2003-91819 A | 3/2003 |

* cited by examiner

Primary Examiner—William Korzuch
Assistant Examiner—Nathan Danielsen
(74) Attorney, Agent, or Firm—Christensen O'Connor Johnson Kindness PLLC

(57) ABSTRACT

An optical disk apparatus for suppressing a Digital Sum Value (DSV) and performing Running Optimum Power Control (R-OPC). An encoding/decoding circuit inserts a synchronization information item to a head of only one synchronous frame when data are recorded on an optical disk. First, the encoding/decoding circuit inserts a synchronization information item having a polarity of either a mark or a space on the basis of a DSV. When the polarity of the first synchronization information item is a mark, the polarity of a next synchronization information item is set to a space. When the polarity of the first synchronization information is a space, the polarity of the next synchronization information is set to a mark. A system controller executes R-OPC at a timing when the synchronization information having the polarity of a mark is recorded on the optical disk.

6 Claims, 6 Drawing Sheets

| | |
|---|---|
| SY0 | 1000#0 010000 000000 001001 |
| SY1 | 10100# 010000 000000 001001 |
| SY2 | 10010# 010000 000000 001001 |
| SY3 | 00000# 010000 000000 001001 |

OPTICAL DISK AND OPTICAL DISK DRIVE FOR SUPPRESSING A DIGITAL SUM VALUE AND LOW-FREQUENCY COMPONENTS

BACKGROUND OF THE INVENTION

1. Field of the Invention

The present invention relates to an optical disk and an optical disk apparatus, and, more particularly, to the configuration of synchronization information.

2. Related Art

An optical disk apparatus has hitherto optimized recording power by means of an OPC (Optimum Power Control) technique or an R-OPC (Running optimum Power Control) technique, thereby recording data. According to the OPC technique, test data are recorded in a predetermined area (PCA) of the optical disk while the recording power is changed in various manners before recording of data, and the test data are reproduced. Recording power at which the quality (e.g., a β value) of the reproduced signal is optimized is selected as optimum recording power. Meanwhile, according to the R-OPC technique, consideration is given to the fact that the sensitivity of a recording film of the optical disk is not necessarily uniform within the plane. When data are actually recorded at the optimum recording power as determined through OPC, the quantity of return light arising at the time of recording of data is monitored. The recording power is controlled by feedback such that the quantity of return light assumes a constant value. In general, the quantity of light of level B is used as the quantity of return light. The level B represents the quantity of return light acquired as a result of formation of a pit when the optical disk is exposed to recording power (i.e., the quantity of return light arising as a result of the recording power having been diffracted by the pit). Specifically, when the quantity of return light of level B falls below a given value, this indicates that pits are formed to an excessive degree. Hence, the recording power is reduced. In contrast, when the quantity of return light of level B falls above the given value, this indicates that pits are formed to an insufficient degree, and the recording power is increased.

Data sets having lengths 3T to 11T (T is a reference clock length) are recorded on a CD-R/RW or the like. However, difficulty is encountered in monitoring the quantity of return light resulting from light being diffracted by pits having short lengths and controlling the recording power through feedback. In light of this difficulty, the quantity of return light arising at the time of recording of a data set having the longest pit length 11T is detected, to thus effect R-OPC. The CD-R/RW complies with specifications of data of a length 11T being included in the synchronization information (SYNC) and of two data sets, each having a length 11T, successively appearing twice in each frame in all cases. Any one of the two data sets, each having a length 11T, inevitably changes to a mark (i.e., a data set for which a pit is formed by radiation of recording power). Therefore, R-OPC is carried out periodically (i.e., at the timing of periodically-inserted synchronization information) through use of the data set having a length 11T, thereby making an attempt to periodically optimize the recording power.

In the case of a DVD-R/RW or the like, pits are formed to data lengths 3T to 11T as in the case of the CD-R or the like. However, a pit length 14T is used for synchronization information. In contrast with the CD-R, the DVD-R/RW complies with specifications of data having a 14T pit length not being successively inserted twice (i.e., a mark and a space are not inserted as a pair) but being inserted only once in one frame (93 bytes). Selection of the data set having a pit length 14T as a mark or a space is arbitrary. For example, when all of data sets having a pit length 14T are set as spaces, pits are not formed to the longest pit length 14T, and hence R-OPC cannot be performed. Consequently, the recording power cannot be periodically optimized, thereby posing difficulty in maintaining recording quality.

As a matter of course, R-OPC can also be considered to be enabled by means of selecting as marks all of the data sets having a 14T pit length. However, when all of the data sets having a 14T pit length are selected as marks, there may arise a fear of an increase in DSV, which results in an increase in low-frequency components. The DSV (Digital Sum Value) is a value determined by accumulating all bits in a sequence—which takes two statuses—from the top while one status (e.g., 1) of the bit sequence is taken as +1 and the other status (e.g., 0) of the same is taken as −1. The smaller the DSV, the smaller the low-frequency components (DC components), resulting in an improvement in recording and reproducing quality.

For an HD-DVD, data sets having lengths 2T to 11T are formed, and a length 13T is used for synchronization information. Since only one data set having a length 13T is inserted in one synchronization frame, similar problems can arise.

In view of the circumstances, Japanese Patent Laid-Open Publication No. 2003-91819 describes a technique for setting marks and spaces as synchronization information items such that they are arranged alternately. According to this technique, R-OPC, or the like, is periodically performed in accordance with the synchronization information about the marks, thereby enabling an attempt to optimize recording power.

However, even when the synchronization information is arranged such that a mark and a space are arranged alternately, there arises a problem of the DSV not necessarily being suppressed. Specifically, the DSV is determined by synchronization information and modulated data subsequent thereto. When the polarity (i.e., being a mark or a space) of the synchronization information and the polarity of the modulated data are set such that the DSV is minimized; that is, when the synchronization information is uniformly set such that a mark and a space are arranged alternately, there arises a necessity for adjusting the DSV through use of only the modulated data, so that the DSV cannot be suppressed. Moreover, if the synchronization information is uniformly fixed such that a mark and a space are arranged alternately, areas which are to become marks arise at all times at the time of recording of data on, e.g., a rewritable optical disk, and a characteristic of the recording film will be deteriorated, thereby resulting in a fear of a decrease in the number of times data on the optical disk can be rewritten.

SUMMARY OF THE INVENTION

The present invention provides an optical disk drive and an optical disk, which solve problems; i.e., performance of Running Optimum Power Control (R-OPC), suppression of a Digital Sum Value (DSV), and prevention of deterioration of a characteristic of a recording film.

An optical disk apparatus of the present invention has recording means for recording data on an optical disk by inserting only one synchronization information in every synchronization frame; and synchronization control means for controlling a polarity of the synchronization information. The synchronization control means (a) sets a polarity of a first synchronization information to either a mark or a space such that a DSV is minimized; and (b) sets a polarity of a next synchronization information to a space when the polarity of the first synchronization information is a mark and sets the polarity of the next synchronization information item to a mark when the polarity of the first synchronization information is a space; and sets polarities of subsequent synchronization information by repetition of processing pertaining to (a) and (b).

In the present invention, the polarity of a first synchronization information is set in accordance with a DSV. The polarity is not fixed but has a certain degree of randomness, and the DSV is suppressed. Moreover, the polarity of the next synchronization information is set so as to become opposite that of the first synchronization information. For instance, even when the polarity of the first synchronization information is a space, the polarity of the synchronization information after the next synchronization information becomes a mark. R-OPC can be performed at the timing of this mark. When the polarity of the first synchronization information is a mark, R-OPC can be performed at that point in time. The synchronization information is formed from data—which do not appear in another data section—and is specified by, e.g., 13T. When the number of synchronization information within an ECC block (e.g., an ECC block consisting of 2 K-byte sector×32) which acts as a recording unit becomes odd, control may be performed over two ECC blocks. However, the last or first synchronization information of the ECC block desirably, independently controls a DSV, to thus complete control within the ECC block.

The present invention provides an optical disk into which only one synchronization information is inserted every synchronous frame. This optical disk takes two successive synchronization information as a unit. Of the two synchronization information, the polarity of the first synchronization information is formed as a mark or a space such that a DSV is minimized. Of the two synchronization information, the polarity of the next synchronization information is formed according to the polarity of the first synchronization information. When the polarity of the first synchronization information is a mark, the polarity of the next synchronization information is formed as a space. When the polarity of the first synchronization information is a space, the polarity of the next synchronization information is formed as a mark. Control of synchronization information employed in the present invention can also be applied solely to a recording-type optical disk and, as a common method, to a reproduction-only optical disk using prepits. The control method of the present invention does not require a change in a reproduction demodulation circuit of the optical disk apparatus, and hence the present invention also has an advantage of acquisition of such a degree of freedom.

The invention will be more clearly comprehended by reference to the embodiment provided below. However, the scope of the invention is not limited to the embodiment.

DETAILED DESCRIPTION OF THE PREFERRED EMBODIMENT

An embodiment of the present invention will be described hereinbelow by reference to the drawings.

Figure 1:
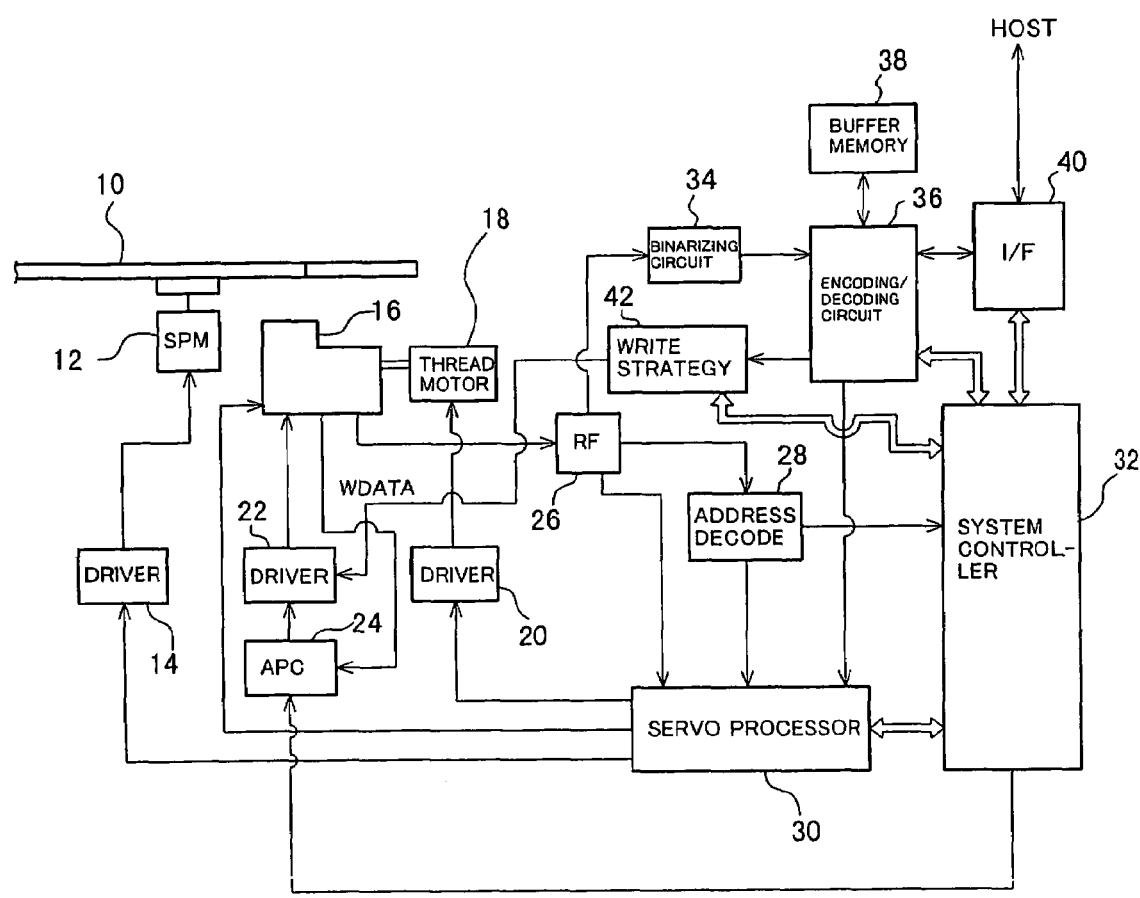
FIG. 1 is an overall block diagram of an optical disk apparatus according to an embodiment of the present invention.

FIG. 1 shows an overall block diagram of an optical disk apparatus according to the embodiment of the present invention. An optical disk 10 is rotationally driven by a spindle motor (SPM) 12. The spindle motor SPM 12 is driven by a driver 14, and the driver 14 is servo-controlled by a servo processor 30 so as to attain a desired rotational speed.

An optical pickup 16 includes a laser diode (LD) for radiating a laser beam onto the optical disk 10, and a photodetector (PD) which receives the light reflected from the optical disk 10 and converts the light into an electric signal. The optical pickup 16 is disposed opposite the optical disk 10. The optical pickup 16 is driven by a thread motor 18 in a radial direction of the optical disk 10, and the thread motor 18 is driven by a driver 20. Like the driver 14, the driver 20 is servo-controlled by the servo processor 30. The LD of the optical pickup 16 is driven by a driver 22, and the driver 22 is controlled by an auto power control circuit (APC) 24 such that a drive current assumes a desired value. The APC 24 controls the drive current of the driver 22 such that optimum recording power selected through OPC (Optimum Power Control) performed in a test area (PCA) of the optical disk 10 is achieved. OPC is processing for recording test data in the PCA of the optical disk 10 while changing the recording power in a plurality of steps, evaluating the quality of a signal by reproducing the test data, and selecting recording power at which desired signal quality is attained. A β value, a γ value, the degree of modulation, a jitter, an asymmetry, or the like, is used as signal quality.

When the data recorded in the optical disk 10 are reproduced, the laser beam of reproducing power is emitted from the LD of the optical pickup 16, and the resultant reflected light is converted into an electric signal by the PD. The thus-converted electric signal is output. A reproduced signal output from the optical pickup 16 is supplied to an RF circuit 26. The RF circuit 26 generates a focus error signal and a tracking error signal from the reproduced signal and supplies the signals to the servo processor 30. On the basis of the error signals, the servo processor 30 servo-controls the optical pickup 16, thereby maintaining the optical pickup 16 in an on-focus state and an on-track state. The RF circuit 26 supplies an address signal included in the reproduced signal to an address decoding circuit 28. The address decoding circuit 28 demodulates address data pertaining to the optical disk from the address signal and supplies the thus-demodulated data to the servo processor 30 and a system controller 32.

The RF circuit 26 supplies a reproduced RF signal to a binarizing circuit 34. The binarizing circuit 34 binarizes the reproduced signal and supplies the resultant modulated signal to an encoding/decoding circuit 36. The encoding/decoding circuit 36 demodulates the binarized signal and subjects the demodulated signal to error correction, to thus produce reproduced data. The encoding/decoding circuit 36 outputs the reproduced data to a host, such as a personal computer, by way of an interface I/F 40. When the reproduced data are output to the host, the encoding/decoding circuit 36 temporarily stores the reproduced data in buffer memory 38 and outputs the thus-stored data.

When data are recorded on the optical disk 10, data to be recorded which are output from the host are supplied to the encoding/decoding circuit 36 by way of the interface I/F 40. The encoding/decoding circuit 36 stores the data to be recorded in the buffer memory 38, encodes the data to be recorded, and supplies the thus-encoded data as modulated data to a write strategy circuit 42. In addition to an 8-16 modulation scheme for a DVD, an 8-12 modulation scheme (ETM) for an HD-DVD or a like scheme can be used as the modulation scheme. In the present embodiment, by way of example, the data are presumed to be modulated by the 8-12 modulation scheme. The HD-DVD is described in, e.g., pp. 125 to 134 of "Nikkei Electronics" Nikkei BP Inc., Oct. 13, 2003. Briefly, an LD having a wavelength of 405 nm is used as the light source, and data are recorded in lands and grooves of the optical disk 10 at a track pitch of about 0.4 μm. Address information is recorded through phase modulation where the phases of wobbles are brought in phase or out of phase with each other. 8-bit data formed by adding an error correction code to the data to be corrected are modulated into a 12-bit code, and the thus-modulated code is recorded on the optical disk 10. Data are recorded to lengths 2T to 11T, and a length 13T exceeding the data lengths is used for synchronization information.

Two types of modulated data (a substitute conversion table) having different DSVs are prepared for data which have not yet been modulated and fall within a certain range (e.g., 0 to 87), and a single modulated data set is prepared for subsequent data. It may be the case that only single modulated data are prepared for data in all ranges.

The write strategy circuit 42 converts the modulated data into a multipulse (pulse train) in accordance with a predetermined recording strategy and supplies the converted data as record data to the driver 22. The recording strategy is formed from, e.g., a pulse width of a leading pulse in a multipulse train, a pulse width of a subsequent pulse, and a pulse duty. The laser beam whose power has been modulated by the recording data is emitted from the LD of the optical pickup 16, whereby the data are recorded on the optical disk 10. After recording of the data, the optical pickup 16 reproduces the recorded data by radiating a laser beam of reproducing power and supplies the reproduced data to the RF circuit 26. The RF circuit 26 supplies a reproduced signal to the binarizing circuit 34, and binarized modulated data are supplied to the encoding/decoding circuit 36. The encoding/decoding circuit 36 decodes the modulated data and verifies the decoded data against the data recorded in the buffer memory 38. The result of verification is supplied to the system controller 32.

When data are recorded, the system controller 32 performs OPC and R-OPC. Specifically, the system controller 32 supplies test data to the encoding/decoding circuit 36 before recording the data and records the test data in a test area of the optical disk 10 while changing the recording power in a plurality of steps. The recorded test data are reproduced by means of the reproducing power, and optimum recording power is selected on the basis of a β value, or the like, of a reproduced RF signal. The thus-selected power is taken as recording power. Moreover, the system controller 32 periodically detects the quantity of return light arising during recording of the data and determines whether or not the level of return light (i.e., a level B) coincides with a predetermined value stored in memory beforehand. When no coincidence exists, the recording power is increased or decreased in accordance with the magnitude of the difference. Namely, when the quantity of return light is a predetermined value or less, the recording power is determined to be excessive, and hence the recording power is decreased. When the quantity of return light exceeds the predetermined value, the recording power is determined to be insufficient, and hence the recording power is increased. Alternatively, the optimum recording power Po selected through OPC and a value Bo of the level B of the quantity of light returned when the test data are recorded at the recording power Po are stored in memory. The recording power is adjusted through use of these values and the level B value detected during recording of the data such that a relationship of $Bo/Po''=B/P''=$constant (where "n" is a positive rational number) is achieved. R-OPC of the present embodiment is carried out at the time of formation of the synchronization information of a mark having the pit length 13T. Therefore, when inserting synchronization information into the head of the synchronous frame, the encoding/decoding circuit 36 sets the polarity of the synchronous information in accordance with a predetermined rule, to thus record the synchronous information on the optical disk 10. The predetermined rule will be described later. Another configuration may also be employed. In this configuration, another synchronization information generation circuit is provided separately from the encoding/decoding circuit 36, and the synchronization information generation circuit generates a synchronization information item and sets the polarity thereof. The thus-generated synchronization information item and the polarity thereof are supplied to the encoding/decoding circuit 36. The encoding/decoding circuit 36 may insert the synchronization information item into the head of the synchronous frame.

Figures 2, 3:
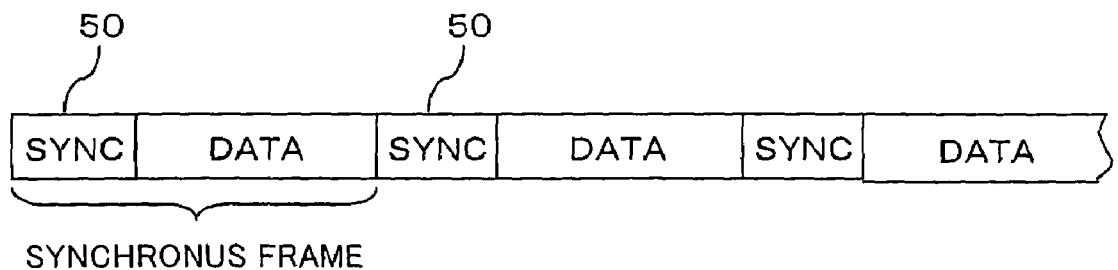
FIG. 2 is a descriptive view of a data format.
FIG. 3 is a descriptive view of the basic configuration of a synchronization information item.

FIG. 2 shows the configuration of physical sectors of the optical disk 10. Respective physical sectors of the optical disk 10 are formed from 26 synchronous frames, and one synchronization information item (SY or SYNC) 50 is formed at the top of each synchronous frame. A plurality of types of synchronization information items (SY) 50; e.g., four types of synchronization information items SY0 to SY3, are prepared for identifying the synchronous frames, and the respective synchronization information items 50 are formed from 24 bits each. As previously described, the 8-12 modulated data are recorded in the data portion according to an NRZI (Non-Return to Zero Inverter) scheme. The NRZI scheme is a scheme for inverting a value immediately preceding a modulation code bit value 1 and maintaining a value immediately preceding a modulated code bit value 0. The modulated data are recorded to data lengths 2T to 11T or to like lengths.

The basic configuration of the synchronization information item will be explained before description of the synchronization information item of the present embodiment.

FIG. 3 shows examples of four types of synchronization information items SY0 to SY3 to be used for identifying a synchronization frame. Here, two types of data; that is, data having a state 0 and data having a state 1, are prepared for the respective synchronization information items SY0 to SY3. Any one is selected from the four types in accordance with an immediately-preceding code data value (an 8-12-converted code of an 8-bit unit). In the drawings, a synchronization information item of state 10 is illustrated by way of an example.

In the drawings, the synchronization information item SY0 is expressed as, e.g., 1000#0 010000 000000 001001, and "#" acts as a DSV control bit for controlling a DSV. The first seven bits 1000#0 0 constitute a variable portion including the DSV control bit. Subsequent bits 10000 000000 001001 form a fixed portion whose data value is fixed. Moreover, the synchronization information item SY1 is expressed as, e.g., 10100# 010000 000000 001001, and "#" similarly acts as a DSV control bit. Any one of 0 and 1 is set as a bit value of the DSV control bit "#." The polarity of the synchronization information is determined in conjunction with the NRZI scheme. When #=1, the synchronization information is referred to as primary synchronization information. When #=0, the synchronization information is referred to as secondary synchronization information. The configuration for preparing primary synchronization information and secondary synchronization information as synchronization information items is known in the field of, e.g., a DVD. In general, in connection with a relationship between the primary synchronization information and the secondary synchronization information, the secondary synchronization information becomes a "space" when the primary synchronization information becomes a "mark." Moreover, the secondary synchronization information becomes a "mark" when the primary synchronization information becomes a "space."

Figure 4:
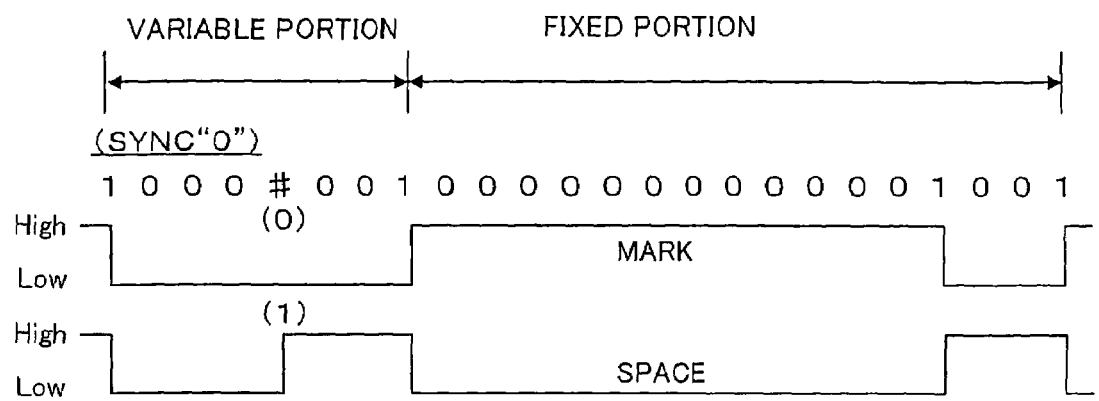
FIG. 4 is a descriptive view showing a relationship between a DSV control bit of a synchronization information item SY0 shown in FIG. 3 and polarities.
Figure 5:
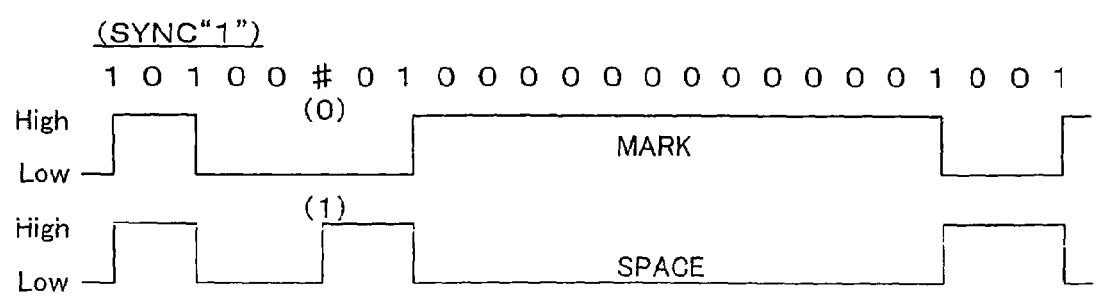
FIG. 5 is a descriptive view showing a relationship between a DSV control bit of a synchronization information item SY1 shown in FIG. 3 and polarities.

FIGS. 4 and 5 show a relationship between the bit value of the control bit "#" and polarities thereof. FIG. 4 shows a relationship between a DSV control bit for synchronization information SY0 and polarities thereof. When the value of the control bit "#" assumes 0, the control bit remains in 0 (Low) in order to maintain an immediately-preceding value 0 (Low). At the next 1 (the first 1 of the control bit for specifying a fixed portion), the immediately-preceding value 0 (Low) is inverted to 1 (High). The synchronization information having a length 13T is recorded as 1 (High); that is, a "mark." The mark area is exposed to a laser beam of recording power, to thus form a pit. Since the immediately-preceding value 1 (High) is again inverted at the next 1, the value changes to 0 (Low) Further, 0 (Low) is inverted at a least significant bit 1 of the synchronization information, whereupon the value changes to 1 (High).

A modulated data portion follows the synchronization information, and data are recorded while a bit 1 of the modulated data is inverted and a bit 0 of the same is maintained.

In the meantime, when the value of the control bit "#" is 1, the preceding bit value 0 (Low) is inverted, and hence the value assumes 1 (High). The preceding value 1 (High) is again inverted to 0 (Low) at the next 1 (the first 1 specifying the fixed portion), and the synchronization information having a length 13T is recorded as 0 (Low) or a "space." Since the immediately-preceding value 0 (Low) is again inverted at the next 1, the value changes to 1 (High). Moreover, 1 (High) is inverted at the least significant bit 1 of the synchronization information to change to 0 (Low).

FIG. 5 shows a relationship between the DSV control bit and polarities of synchronization information SY1. As in the case of the synchronization information SY0, number 1 is incremented or decremented depending on whether the bit value of "#" is 0 or 1. As mentioned above, number 1 is changed between the case where the DSB control bit "#" assumes 0 and the case where the DSB control bit "#" assumes 1. The DSV is understood to be able to be controlled by the bit value of the control bit "#."

FIGS. 4 and 5 show that the synchronization information is simultaneously determined as a mark or a space depending on the value of the control bit "#." For instance, when the value of the DSV control bit "#" is set to 1 in order to decrease the DSV of the synchronization information SY0, the synchronization information SY0 is recorded as a space. As a result, R-OPC—which is to be performed for the synchronization information about a mark for which a pit is formed by radiation of a laser beam of recording power—cannot be carried out. In contrast, when the DSV control bit "#" of certain synchronization information is set to 0 in order to carry out R-OPC, the DSV of data may be increased.

In the present embodiment, as mentioned previously, in order to satisfy a demand for decreasing the DSV and another demand for optimizing recording power by periodically performing R-OPC, as well as a demand for suppressing the number of rewriting operations, which would otherwise be high as a result of the arrangement or layout of a mark or a space being fixed uniformly, the polarity of the synchronization information having a length 13T is determined as follows.

Figure 6:
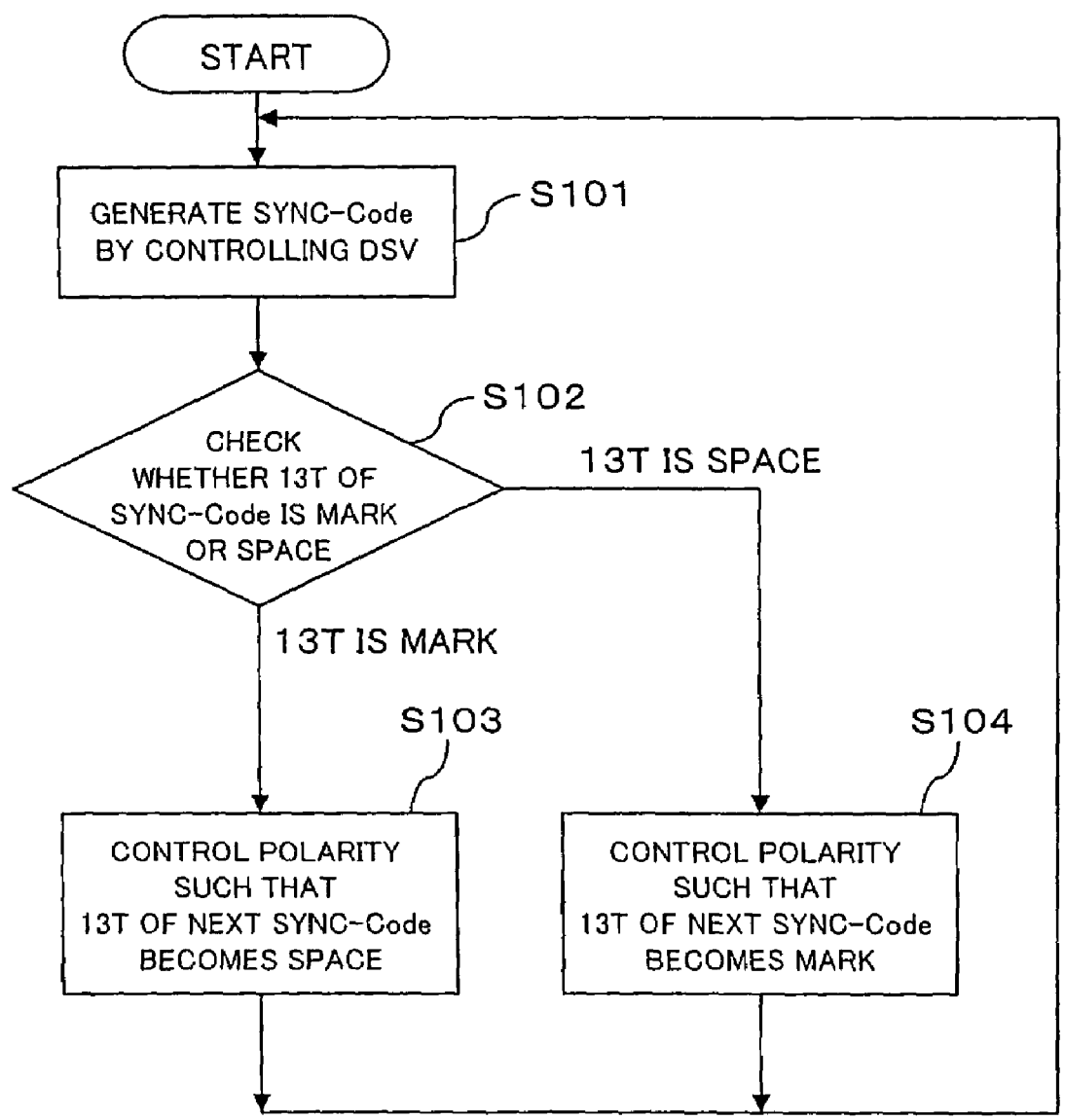
FIG. 6 is a processing flowchart of the embodiment.

FIG. 6 shows a flowchart employed when the encoding/decoding circuit 36 sets the polarity of synchronization information during recording of data. In the drawing, synchronization information is designated as "SYNC-Code."

First, when synchronization information is inserted into the head of the synchronous frame, the synchronization information is generated by means of controlling a DSV (S101). Specifically, the control bit "#" of the synchronization information is set to 0 or 1 such that the DSV is minimized. More specifically, the value of the control bit "#" of SYNC is determined such that a DSV formed from the control bit "#" of SYNC to the control bit "#" of next data set assumes a polarity which decreases DSVs preceding the current DSV. A control bit "#" of a certain SYNC determines a DSV of a data set immediately preceding the control bit "#" of the next SYNC.

A determination is made as to whether the polarity of the first synchronization information item (the polarity of information corresponding to 13T) set through processing pertaining to S101 is a mark or a space (S102). When the polarity of the first synchronization information item is a mark, R-OPC is performed at a timing when the synchronization information is a mark, thereby adjusting the recording power. As in the case of the first synchronization information item, the polarity of the next synchronization information item (synchronization information of a second synchronization frame) is set to a polarity opposite that of the first synchronization information item; that is, to a space (S103).

In the meantime, when in step S102 the polarity of the first synchronization information item is determined to be a space, the polarity of the next synchronization information item (i.e., synchronization information of the second synchronization frame) is set to a polarity opposite that of the first synchronization information; that is, to a mark (S104). As a result of DSV control being performed in S101 and the polarity of the next synchronization information item being set to a mark in S104, the DSV can be suppressed, and R-OPC can be carried out.

Polarities of subsequent synchronization information items are set by means of repeating processing pertaining to steps S101 to S104. Specifically, two successive synchronization information items are taken as a single processing unit, and the polarity of the first synchronization information item of the two synchronization information items is set by means of controlling the DSV (S101), and the polarity of the next synchronization information item is set to a polarity opposite that of the first synchronization information item (S103, S104). As a result, when the polarity of the first synchronization information item is a mark, R-OPC can be carried out at the timing of the mark, and the polarity of the next synchronization information item is set to a space, to thus suppress the DSV. Even when the polarity of the first synchronization information item is a space, the polarity of the next synchronization information item can be set to a mark, thereby performing R-OPC and suppressing the DSV.

FIGS. 7A to 7D illustrate polarities of a series of synchronization information items set through the foregoing processing operations. Such synchronization information items are formed on the optical disk 10 of the present embodiment.

Figure 7A:
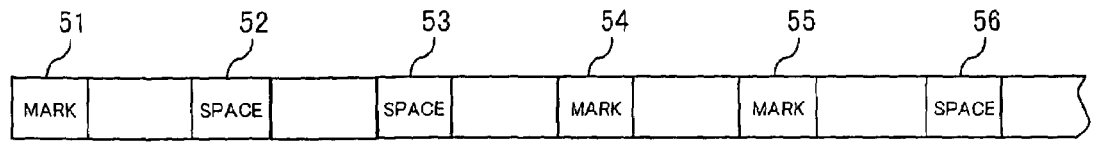
FIG. 7A is a descriptive view of the polarities of synchronization information items formed through processing shown in FIG. 6.

In FIG. 7A, the polarity of a first synchronization information item 51 after initiation of recording operation is set to, e.g., a mark, by means of controlling a DSV (S101). Since the polarity of the first synchronization information item 51 (the polarity of a portion of the synchronization information corresponding to T13) is a mark, the polarity of the next synchronization information item 52 is set to a space; i.e., to the polarity opposite that of the mark (S103). The polarity of the next synchronization information item 53 is set to, e.g., a space by means of repetition of the DSV control operation (S101). The polarity of the next synchronization information item 54 is set to a mark; i.e. to the polarity opposite that of the space (S104), because the polarity of the synchronization information item 53 is a space. The polarity of the next synchronization information item 55 is set to, e.g., a mark by means of a repetition of the DSV control operation (S101). Moreover, the polarity of the next synchronization information item 56 is set to a space, because the polarity of the synchronization information item 55 is a mark (S103). The same applies to any counterparts in the following synchronization information items.

In FIG. 7A, the polarities of the synchronization information items 51, 54, and 55 are set to a mark. This means that R-OPC can be always performed in one synchronization frame of two successive synchronization frames and that power of a recording laser beam can be controlled through feedback. Polarities of the synchronization information items 51, 53, and 55 are set such that the DSV is minimized. Hence, the DSVs are also suppressed.

Figure 7B:
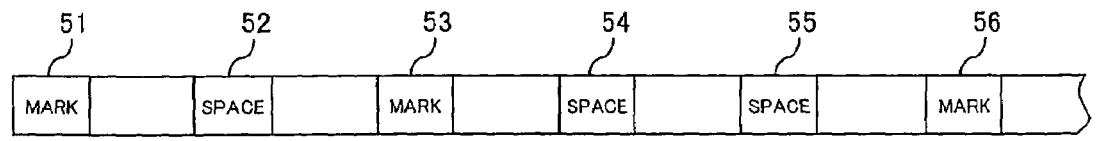
FIG. 7B is a descriptive view of the polarities of synchronization information items formed through processing shown in FIG. 6.

In FIG. 7B, the polarity of the first synchronization information item 51 is set to, e.g., a mark, by means of DSV control operation (S101). The polarity of the next synchronization information item 52 is set to a space, because the polarity of the first synchronization information item 51 is a mark (S103). The polarity of the next synchronization information item 53 is set to, e.g., a mark, by a repetition of the DSV control operation (S101). The polarity of the next synchronization information item 54 is set to a space, because the polarity of the synchronization information items 53 is a mark (S103). The polarity of the next synchronization information item 55 is set to, e.g., a space, by means of a repetition of DSV control operation (S101). The polarity of the synchronization information 56 is set to a mark, because the synchronization information items 55 is a space (S104).

The polarities of the synchronization information items 51, 53, and 56 are set to a mark, and hence R-OPC is performed at the timings of these synchronization information items. The polarities of the synchronization information items 51, 53, and 55 are set such that the DSVs are minimized. Hence, the DSVs are also suppressed.

Figure 7C:
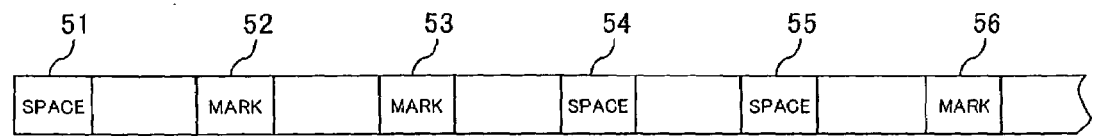
FIG. 7C is a descriptive view of the polarities of synchronization information items formed through processing shown in FIG. 6.

In FIG. 7C, the polarity of the first synchronization information item 51 is set to, e.g., a space, by means of DSV control operation (S101). The polarity of the next synchronization information item 52 is always set to a mark, because the polarity of the first synchronization information item 51 is a space (S104). The polarity of the next synchronization information item 53 is again set to, e.g. a mark, by means of repetition of DSV control operation (S101). The polarity of the next synchronization information item 54 is set to a space, because the polarity of the synchronization information 53 is a mark (S103). The polarity of the next synchronization information 55 is set to, e.g., a space by means of repetition of the DSV control operation (S101). The polarity of the synchronization information 56 is set to a mark, because the polarity of the synchronization information 55 is a space (S104).

The polarities of the synchronization information items 52, 53, and 56 are set to a mark, and hence R-OPC is performed at the timings of these synchronization information items. The polarities of the synchronization information items 51, 53, and 55 are set such that the DSVs are minimized. Hence, the DSVs are also suppressed.

Figure 7D:
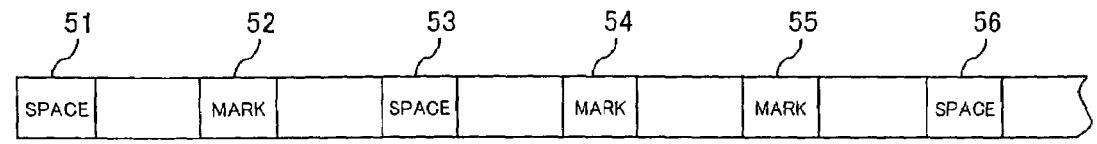
FIG. 7D is a descriptive view of the polarities of synchronization information items formed through processing shown in FIG. 6.

In FIG. 7D, the polarity of the first synchronization information item 51 is set to, e.g., a space, by means of DSV control operation (S101). The polarity of the next synchronization information item 52 is always set to a mark, because the polarity of the first synchronization information item 51 is a space (S104). The polarity of the next synchronization information item 53 is set to, e.g., a space by means of repetition of DSV control operation (S101). The polarity of the next synchronization information item 54 is always set to a mark (S104), because the polarity of the synchronization information 53 is a space. The polarity of the next synchronization information item 55 is set to, e.g., a mark, by means of a repetition of DSV control operation (S101). The polarity of the next synchronization information item 56 is set to, e.g., a space, because the polarity of the synchronization information item 55 is a mark (S103).

Since the polarities of the synchronization information items 52, 54, and 55 are set to a mark, R-OPC is performed at the timings of these synchronization information items. Further, the polarities of the synchronization information items 51, 53, and 55 are set such that the DSVs are minimized. Hence, the DSVs are suppressed as well.

As is obvious from FIGS. 7A to 7D, in the present embodiment, the polarity of a subsequent synchronization information item is changed depending on whether the polarity of the first synchronization information item determined through DSV control is a mark or a space, thereby setting the polarity of the subsequent synchronization information item to a polarity opposite that of the polarity of the first synchronization information item determined through DSV control. For this reason, a mark and a space do not appear in a fixed pattern. Consequently, a mark does not always appear in a specific location on the optical disk 10, and deterioration of a characteristic of the recording film and a decrease in the number of rewritable operations, which would otherwise be caused by deterioration of the characteristic of the recording film, can be prevented as well.

Moreover, the polarity of the first synchronization information item of successive synchronization information items is set by means of DSV control. Hence, the DSV can be suppressed. Further, a mark inevitably appears once every two times, thereby enabling R-OPC. Therefore, in the present embodiment, suppression of the DSV, execution of R-OPC, and an improvement in the number of rewriting operations can be achieved.

Figure 8:
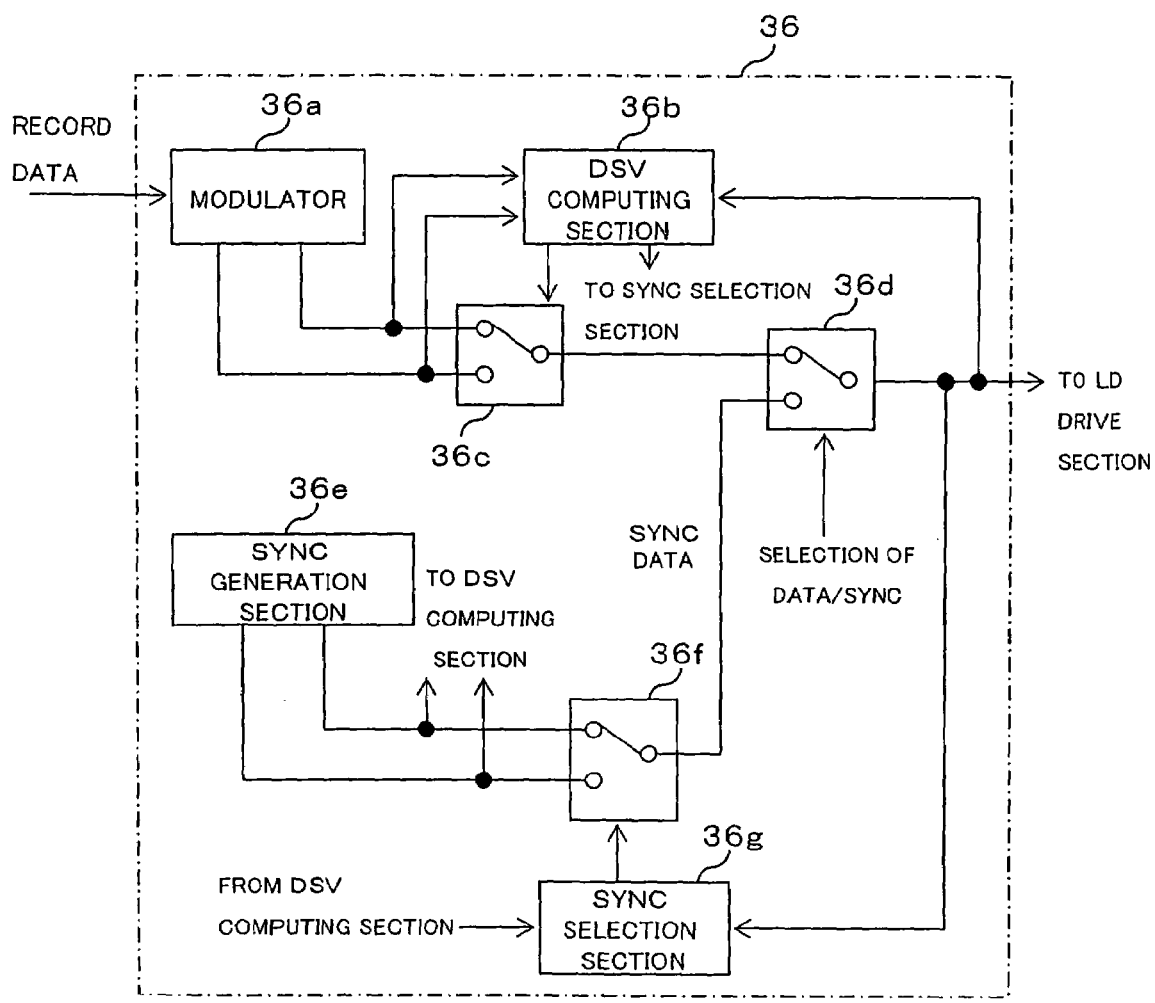
FIG. 8 is a block diagram showing the configuration of an encoding circuit.

FIG. 8 shows an example of a circuit configuration for inserting and recording synchronization information according to the above-described rule. This circuit is to be embedded in the encoding section of the encoding/decoding circuit 36 shown in FIG. 1.

The encoding section of the encoding/decoding circuit 36 is formed from a modulator 36a, a DSV computing section 36b, a SYNC generation section 36e, a SYNC selection section 36g, and selection switches 36c, 36d, and 36f.

The modulator 36a subjects the record data output from the buffer 38 to 8-12 conversion to thus generate signals 2T to 11T and supplies the thus-generated signals to the selection switch 36c. The modulator 36a generates two types of data sets according to the value of the record data and supplies the generated data to the selection switch 36c.

The DSV computing section 36b computes the modulated data supplied to the optical pickup 16; that is, the DSV of the data to be recorded in the optical disk 10, and supplies a selection signal to the selection switch 36c on the basis of the computing result, thereby selecting modulated data. The modulated data selected by the selection switch 36c on the basis of the DSV are then supplied to the selection switch 36d. There may also be adopted a configuration where the modulated data are supplied in unmodified form to the selection switch 36d without provision of the selection switch 36c.

The selection switch 36d is a switch for switching between the modulated data and the synchronization information and performs switching operation in accordance with wobble address detected data (data/SYNC selection data) output from the system controller 32 and a clock signal. When the wobble address detected data are output from the system controller 32 and a predetermined clock is counted on the basis of the address detected data, the time is determined to be a timing when any of SY0 to SY3 is inserted as synchronization information, and hence the selection switch 35d is switched to a position for SYNC data, to thus output the synchronization information. At any timing other than that timing, the selection switch 36d is switched to a position for the modulated data supplied from the selection switch 36c, thereby outputting the modulated data to the optical pickup 16. As a result, the synchronization information items SY0 to SY3 are inserted to synchronization positions. The modulated data/SYNC output from the selection switch 36d are supplied to the write strategy circuit 42 after having been converted into an NRZI scheme, and the data are further supplied to the LD drive section. After having been converted into the NRZI scheme by the write strategy circuit 42, the data/SYNC may be supplied to the LD drive section.

The SYNC generation section 36e is for generating synchronization information having a length 13T; generates synchronization information patterns where the polarity of the synchronization information comes to a mark and a space, in connection with respective synchronization information items SY0 to SY3; and supplies the thus-generated synchronization information patterns to the selection switch 36f. Specifically, synchronization information patterns of "100000 010000 000000 001001" (in the case of #=0) and "100010 010000 000000 001001" (in the case of #=1) are generated for SY0. Synchronization information patterns of "101000 010000 000000 001001" (in the case of #=0) and "101001 010000 000000 001001" (in the case of #=1) are generated for SY1. These synchronization information patterns are supplied to the selection switch 36f. The thus-generated synchronization information patterns are supplied to the DSV computing section 36b, as well. In these respective cases, DSVs are computed.

The selection switch 36f is a switch for selecting any one of two synchronization information patterns in relation to each of SY0 to SY3. Selection of the synchronization information pattern is controlled by the SYNC selection section 36g. The SYNC selection section 36g selects either a mark or a space in accordance with the processing flowchart shown in FIG. 6.

Specifically, in accordance with the DSV supplied from the DSV computing section 36b, a contact point of the selection switch 36f is switched such that either a mark or a space is output from the SYNC generation section 36e. The result of switching of a polarity is stored in internal memory of the SYNC selection section 36g. The SYNC selection section 36g switches the contact point of the selection switch 36f so as to select a synchronization information pattern whose polarity is opposite the previously-selected polarity, at the timing of insertion of the next synchronization information item. More specifically, when the previously-selected polarity is a mark, a space is selected. When the previously-selected polarity is a space, a mark is selected.

Subsequently, the SYNC selection section 36g again switches the contact point of the selection switch 36f such that either a mark or a space output from the SYNC generation section 36e is selected, in accordance with the DSV supplied from the DSV computing section 36b.

The foregoing operation of the SYNC selection section 36g is achieved by sequentially executing the processing program. The operation can also be achieved by the system controller 32 fulfilling the function of the SYNC selection section 36, or the operation can be executed by the SYNC selection section 36g in response to a command from the system controller 32.

By means of the foregoing processing operations, R-OPC can be performed at a sufficiently short cycle. Moreover, data recording involving a small DSV becomes feasible. The arrangement of a mark and a space is not fixed, and hence a mark is prevented from appearing in a specific location at all times, thereby preventing occurrence of a decrease in the number of rewriting operations.

The configuration shown in FIG. 8 is a mere embodiment, and a person who is skilled in the art can readily embody another configuration. In another embodiment of such a configuration, a synchronization information pattern is generated on the basis of a DSV of a first synchronization information item of two synchronization information items output from the SYNC generation section 36e. For the other synchronization information item, a synchronization information pattern is formed such that a DSV control bit of the remaining synchronization information item assumes a value which is the inverse of the value of a DSV control bit of the first synchronization information item. The thus-generated synchronization information item is output to the selection switch 36d.

What is claimed is:
1. An optical disk apparatus comprising:
recording means for recording data on an optical disk by inserting only one synchronization information in every synchronization frame; and
synchronization control means for controlling a polarity of said synchronization information, wherein
said synchronization control means

(a) sets the polarity of a first synchronization information to either a mark or a space such that a digital sum value is minimized; and (h) sets the polarity of a next synchronization information to a space when said polarity of said first synchronization information is a mark and sets said polarity of said next synchronization information to a mark when said polarity of said first synchronization information is a space; and (c) sets polarities of subsequent synchronization information by repetition of processing pertaining to (a) and (b).

2. The optical disk apparatus according to claim 1, further comprising:

means for controlling a power of a recording laser beam at a time when said synchronization information is recorded by detecting a return light level acquired from said optical disk when said polarity of said recorded synchronization information is a mark.

3. The optical disk apparatus according to claim 1, wherein said synchronization information is formed from data which do not appear in a data portion other than said synchronization information and are of a long duration.

4. An optical disk apparatus comprising:

a pickup for recording data by radiating a laser beam of recording power to an optical disk a driver for driving said pickup; and an encoder for supplying encoded record data to said driver, wherein said encoder has a synchronization information generation section for generating synchronization information having a mark as a polarity and synchronization information having a space as a polarity;

an insertion section which selects either said synchronization information having a mark as said polarity or said synchronization information having a space as said polarity, both being generated by said synchronization information generation section, and inserting the selected synchronization information to the head of a synchronous frame;

a digital sum value computing section for computing a digital sum value of said synchronous frame into which said synchronization information is inserted; and a synchronization information selection section for controlling said insertion section such that said polarity of said synchronization information of a first one of two successive synchronous frames is formed as a mark or a space such that said digital sum value is minimized and for controlling said insertion section such that said polarity of said synchronization information of a next synchronous information frame is formed either as a space when said polarity of said first synchronization information is a mark or as a mark when said polarity of said first synchronization information is a space.

5. The optical disk apparatus according to claim 4, further comprising:

a detection circuit for detecting a return light level acquired by said pickup at a time when said synchronization information having a polarity of a mark is recorded on said optical disk; and a controller for controlling said recording power in accordance with said return light level.

6. An optical disk into which only one synchronization information is inserted every synchronization frame, wherein two successive synchronization information are taken as a unit, and a polarity of a first synchronization information of said two successive synchronization information is formed as a mark or a space such that a digital sum value is minimized; and a polarity of a next synchronization information of said two successive synchronization information is formed in accordance with said polarity of said first synchronization information, such that said polarity of said next synchronization information is formed either as a space when said polarity of said first synchronization information is a mark or said polarity of said next synchronization information is formed as a mark when said polarity of said first synchronization information is a space.

* * * * *

UNITED STATES PATENT AND TRADEMARK OFFICE
CERTIFICATE OF CORRECTION

PATENT NO. : 7,355,942 B2  Page 1 of 1
APPLICATION NO. : 10/991918
DATED : April 8, 2008
INVENTOR(S) : A. Mashimo et al.

It is certified that error appears in the above-identified patent and that said Letters Patent is hereby corrected as shown below:

On the Title Page, Item (73) please insert

(73) Assignee before the line that begins "NEC Corporation", insert a line as follows:

--TEAC Corporation, Mushashino-shi--

Signed and Sealed this

Eighteenth Day of November, 2008

JON W. DUDAS
*Director of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 7,355,942 B2 | |
| APPLICATION NO. | : 10/991918 | |
| DATED | : April 8, 2008 | |
| INVENTOR(S) | : A. Mashimo et al. | |

It is certified that error appears in the above-identified patent and that said Letters Patent is hereby corrected as shown below:

On the Title Page, Item (73) please insert

(73)   Assignee   before the line that begins "NEC Corporation", insert a line as follows:

--TEAC Corporation, Musashino-shi--

This certificate supersedes the Certificate of Correction issued November 18, 2008.

Signed and Sealed this
Twelfth Day of April, 2011

David J. Kappos
*Director of the United States Patent and Trademark Office*